United States Patent
Figarski et al.

(10) Patent No.: US 9,221,614 B2
(45) Date of Patent: Dec. 29, 2015

(54) DEVICE FOR TRANSFERRING FILTER SEGMENTS IN THE PROCESS OF MANUFACTURING MULTI-SEGMENT FILTER RODS

(75) Inventors: Jacek Figarski, Szydlowiec (PL); Radoslaw Figarski, Radom (PL); Kazimierz Makosa, Jedlnia Let. (PL); Ryszard Dominiak, Warsaw (PL); Bartosz Cieslikowski, Przysucha (PL)

(73) Assignee: INTERNATIONAL TOBACCO MACHINERY POLAND SP. Z O.O., Radom (PL)

( * ) Notice: Subject to any disclaimer, the term of this patent is extended or adjusted under 35 U.S.C. 154(b) by 161 days.

(21) Appl. No.: 14/110,327

(22) PCT Filed: Apr. 5, 2012

(86) PCT No.: PCT/PL2012/000024
§ 371 (c)(1),
(2), (4) Date: Oct. 7, 2013

(87) PCT Pub. No.: WO2012/138241
PCT Pub. Date: Oct. 11, 2012

(65) Prior Publication Data
US 2014/0021014 A1    Jan. 23, 2014

(30) Foreign Application Priority Data
Apr. 6, 2011 (PL) .......................................... 394455

(51) Int. Cl.
*B65G 37/00* (2006.01)
*B65G 29/02* (2006.01)
(Continued)

(52) U.S. Cl.
CPC ............... *B65G 37/00* (2013.01); *A24C 5/325* (2013.01); *A24D 3/0287* (2013.01); *B65G 29/02* (2013.01);
(Continued)

(58) Field of Classification Search
CPC ........ B65G 17/44; B65G 29/02; B65G 37/00; B65G 47/18; B65G 47/19; B65G 47/04; B65G 47/06; B65G 47/08; B65G 47/1407; B65G 47/1471; B65G 47/57; B65G 2201/0226; A24C 5/325; A24C 5/322; A24C 5/323; A24C 5/326; A24C 5/327; A24D 3/0287
See application file for complete search history.

(56) References Cited

U.S. PATENT DOCUMENTS 2,957,285 A * 10/1960 Molins ............................ 493/47
3,357,320 A * 12/1967 Hagan et al. .................... 493/47
(Continued)

FOREIGN PATENT DOCUMENTS

| EP | 1767107 A1 | 3/2007 |
| EP | 2210509 A1 | 7/2010 |
| WO | 2009/074540 A1 | 6/2009 |

OTHER PUBLICATIONS

International Search Report dated Aug. 13, 2012, issued in corresponding application No. PCT/PL2012/000024.

*Primary Examiner* — Leslie A Nicholson, III
*Assistant Examiner* — Keith R Campbell
(74) *Attorney, Agent, or Firm* — Westerman, Hattori, Daniels & Adrian, LLP (57) ABSTRACT

Device for transferring cylindrical segments from a hopper onto a grouping belt is provided with a guiding drum, having flutes on its periphery and a circumferentially closed conveyor which delivers segments to a rotary element with pushers. Conveyor with seats with a catching element for catching segments, and transferring the segments from the conveyor to the element is effected by means of a spiral drum. The device has a push-down element constituted by a cam with a groove of a height corresponding to the diameter of the segment. The catching element has the form of a depression in the body of the seat shaped as a half of a cylinder, corresponding to the diameter of the segment, with locks on edges, whereas the axis of the depression is perpendicular to the direction of motion of the conveyor.

16 Claims, 7 Drawing Sheets

(51) Int. Cl.
  *B65G 47/14* (2006.01)
  *A24C 5/32* (2006.01)
  *A24D 3/02* (2006.01)
  *B65G 17/44* (2006.01)

(52) U.S. Cl.
  CPC ........ *B65G 47/1407* (2013.01); *B65G 47/1471* (2013.01); *B65G 17/44* (2013.01); *B65G 2201/0226* (2013.01)

(56) References Cited

U.S. PATENT DOCUMENTS

| | | | |
|---|---|---|---|
| 3,513,856 A * | 5/1970 | Hagan et al. | 131/94 |
| 4,283,187 A | 8/1981 | Molins et al. | |
| 4,287,979 A * | 9/1981 | Molins et al. | 198/418.2 |
| 4,411,640 A * | 10/1983 | Hall | 493/45 |
| 4,437,559 A * | 3/1984 | Ackley et al. | 198/397.04 |
| 4,657,130 A * | 4/1987 | Ackley et al. | 198/397.04 |
| 5,630,499 A * | 5/1997 | Louden et al. | 198/867.14 |
| 6,357,495 B1 * | 3/2002 | Baroncini | 141/185 |
| 8,475,348 B2 * | 7/2013 | Yanchev et al. | 493/39 |
| 8,967,370 B2 * | 3/2015 | Cieślikowski et al. | 198/729 |
| 2005/0155842 A1 * | 7/2005 | Salicini et al. | 198/459.2 |
| 2007/0117700 A1 | 5/2007 | Kushihashi et al. | |
| 2009/0145449 A1 * | 6/2009 | Cieślikowski et al. | 131/280 |
| 2012/0157278 A1 | 6/2012 | Cieślikowski et al. | |
| 2013/0029821 A1 * | 1/2013 | Hoffmann | 493/4 |

* cited by examiner

DEVICE FOR TRANSFERRING FILTER SEGMENTS IN THE PROCESS OF MANUFACTURING MULTI-SEGMENT FILTER RODS

BACKGROUND OF THE INVENTION

The object of the invention is a device for transferring cylindrical filter segments from a filter segment hopper onto a grouping belt in the process of manufacturing multi-segment filter rods for cigarettes.

In the tobacco industry, there is a demand for multi-segment filter rods used for the manufacture of cigarettes which are composed of at least two kinds of segments made of different filter materials; such segments can be soft, filled for example with unwoven cloth, paper, cellulose acetate, or hard, filled with granulate or sintered elements, or hollow cylinders, where multi-segment filter rods can comprise segments made of hard material which is not suitable for cutting in devices used in the production line of the tobacco industry. From the European patent no. EP 2.210.509 A1 an apparatus and a method for combining, in a linear method, of two or more different segments in the process of manufacturing smoking articles from which at least one is not intended for cutting in the filter manufacturing process are known. Each kind of segments is transferred from the corresponding hopper onto a linear conveyor on which the transferred segments are arranged in such position that their axes correspond with the direction of motion of the conveyor, and then by means of an index wheel with the axis of rotation perpendicular to the plane of motion of the linear conveyor are positioned on the grouping belt. The formed sequence of segments, after wrapping in wrapper paper, is then divided into filters used for cigarette manufacturing. A similar principle of transferring segments linearly from the hopper onto the grouping tape, where their axes are positioned along the direction of motion of the conveyor, is used in the European patent. EP 2.230.951 A1, however, in this solution positioning of segments on the grouping tape is carried out by means of an index wheel with the axis of rotation parallel to the plane of motion of the linear conveyor. On the other hand, in the European patent no. EP 1.833.723 B1 a system for transferring segments from hoppers in a crosswise method was presented. Segments of each kind are transported from the hopper by means of appropriately matched drums and after combining in groups of segments, then wrapping in tissue paper, are transferred onto a belt conveyor in crosswise arrangement relative to the direction of motion of the conveyor. A similar system for transferring segments from the hopper by means of a set of drums onto a linear conveyor, provided with crosswise flutes in which the segments are combined in a filter rod, was presented as an option in the European patent no. EP 1.427.299 B1 (FIG. 11, FIG. 12a, FIG. 12b, FIG. 13a and FIG. 13b of the drawing).

SUMMARY OF THE INVENTION

The object of the invention is the construction of a device for transferring cylindrical filter segments from a filter segment hopper onto a grouping belt which delivers the segments in a linear method to a machine manufacturing multi-segment filter rods, the segments being collected by means of a guiding drum with a horizontal axis of rotation, having flutes on its periphery, and delivered by means of a circumferentially closed conveyor to a rotary transferring element, provided with pushers on its periphery, which puts the segments onto the said grouping tape. According to the invention a conveyor is provided with seats provided with catching elements for catching a cylindrical segment, whereas transferring of the segments from the conveyor to a transferring element is effected by means of a spiral drum. The device can be provided with an intermediate drum with a horizontal axis of rotation, having flutes on its periphery, used for transferring segments to flutes of a guiding drum. The device has a push-down element, disposed between the guiding drum and the seats of the conveyor, needed for transferring segments from the flutes of the guiding drum to the catching elements of the seats of the conveyor. The push-down element is constituted by a cam provided with a groove of a height corresponding to the diameter of the segment. As an alternative, the push-down element can be constituted by rotating wheels with the axis of rotation parallel to the axis of the guiding drum, provided with circular sectors on its periphery with a radius slightly greater than a half of the diameter of the segment. The catching element can have the form of a depression in the body of the seat shaped as a half of a cylinder, corresponding to the diameter of the segment, or can have the form of a depression in the body of the seat, with the height greater than a half of the diameter of the segment, and the depression is provided with locks on edges, whereas each depression is perpendicular to the direction of motion of the conveyor. The conveyor of the device has projecting spigots for mounting the seats, whereas the conveyor can have the form of a flexible belt provided with spigots projecting above its surface or can be constituted by a chain the links of which are connected by pivots projecting above the surface of the link, forming spigots for mounting the seats. The pivots of the spigots can be situated vertically or horizontally. The body of the seat is constituted by a rectangular solid with a catching element shaped in the upper wall, and in the base of the body are disposed holes for mounting the seat on the spigots, whereas the plane of the base can be situated parallel or perpendicular to the axis of the catching element. The spiral drum has at least one conical surface, and underneath the spiral drum there is a ramp having a surface parallel to the conical surface, having a channel along which the conveyor with seats moves so that the ends of segments protruding out of the catching element meet the surface of the ramp, which pushes the segments consecutively into the groove of the spiral of the drum. If a spiral drum with two conical surfaces with opposite inclination angles relative to the drum axis is used, the ramp situated underneath the spiral drum has the surface with inclination angles matching the inclination angles of conical surfaces of the drum. As an alternative, the spiral drum can have the form of a cylinder, whereas in such case the guide situated beneath the drum has the surface parallel to the generator of the drum, and has a groove along which the conveyor with seats moves so that the ends of segments protruding out of the catching element are pushed consecutively into the groove of the spiral of the drum. Due to such construction, the device works reliably, transfers individual segments in a stable and fast manner, puts them in a programmed place on the grouping belt, and the position of segments is fully controlled at each stage of the transport.

BRIEF DESCRIPTION OF THE DRAWINGS

The object of the invention has been shown in embodiments in a diagrammatic drawing in which.

DETAILED DESCRIPTION OF THE INVENTION

Figure 1:
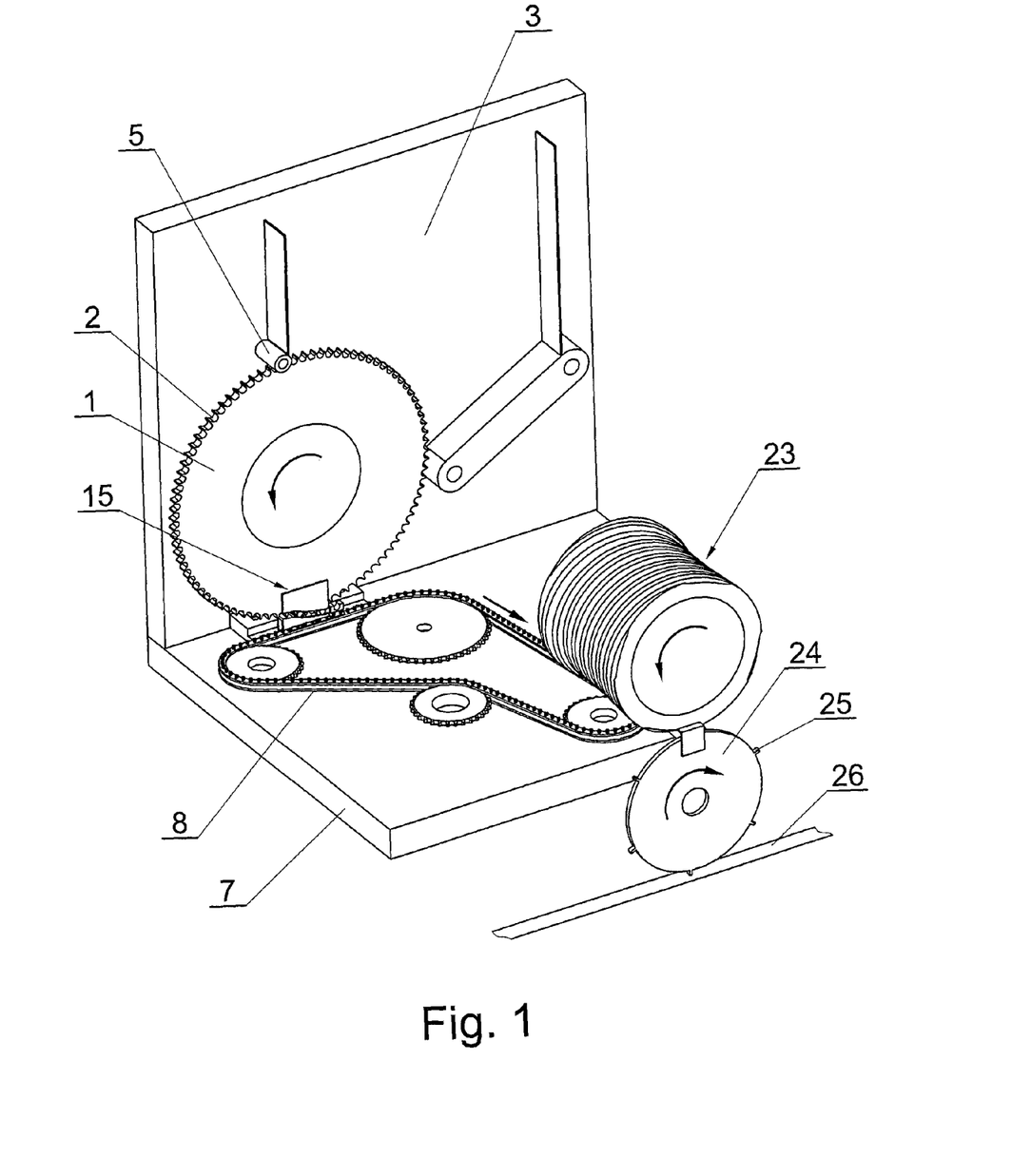
FIG. 1 shows a device in a perspective view comprising a push-down element in the form of a cam, a conveyor in the form of a flexible belt moving in a horizontal plane, provided with spigots projecting above its surface, with axes situated vertically, and a spiral drum with two conical surfaces, FIG. 2—a front view of a fragment of the device of FIG. 1 showing a push-down element in the form of a cam, FIG. 3—a front view of a fragment of the device of FIG. 1 with an alternative push-down element in the form of rotating wheels, FIG. 4—a lateral view of a fragment of the device of FIG. 1 showing the cooperation of a horizontal conveyor with a spiral drum having two conical surfaces, FIG. 5—a lateral view of a fragment of the device as in FIG. 4 showing the cooperation of a horizontal conveyor with an alternative spiral drum having one conical surface, FIG. 6—another embodiment of the device in a lateral view comprising a push-down element in the form of a cam, a conveyor in the form of a flexible belt moving in a horizontal plane and a spiral drum in the form of a cylinder, FIG. 7—a fragment of the conveyor in the form of a flexible belt provided with projecting spigots with vertical axes, FIG. 8—a fragment of the conveyor in the form of a flexible belt provided with projecting spigots with horizontal axes, FIG. 9—a fragment of the conveyor in the form of a chain whose protruding pivots form spigots situated vertically, FIG. 10—a fragment of the conveyor in the form of a chain whose protruding pivots form spigots situated horizontally, FIG. 11—a seat in the body of which a catching element in the form of a half of a cylinder is shaped, having in the base the holes for spigots with horizontal axes, FIG. 12—a seat as in FIG. 11, where the base is situated vertically on the edge of the body, FIG. 13—an inverted seat in the body of which a catching element in the form of a half of a cylinder is shaped, having in the base the holes for spigots with vertical axes, FIG. 14—a seat in the body of which a catching element in the form of a depression is shaped, and a horizontal base laterally protruding from the body has holes for spigots with vertical axes, and FIG. 15—a seat in the body of which a catching element in the form of a half of a cylinder is shaped, connected with a horizontal base by means of a vertical lateral connector, having in the body the holes for spigots with vertical axes.
Figure 2:
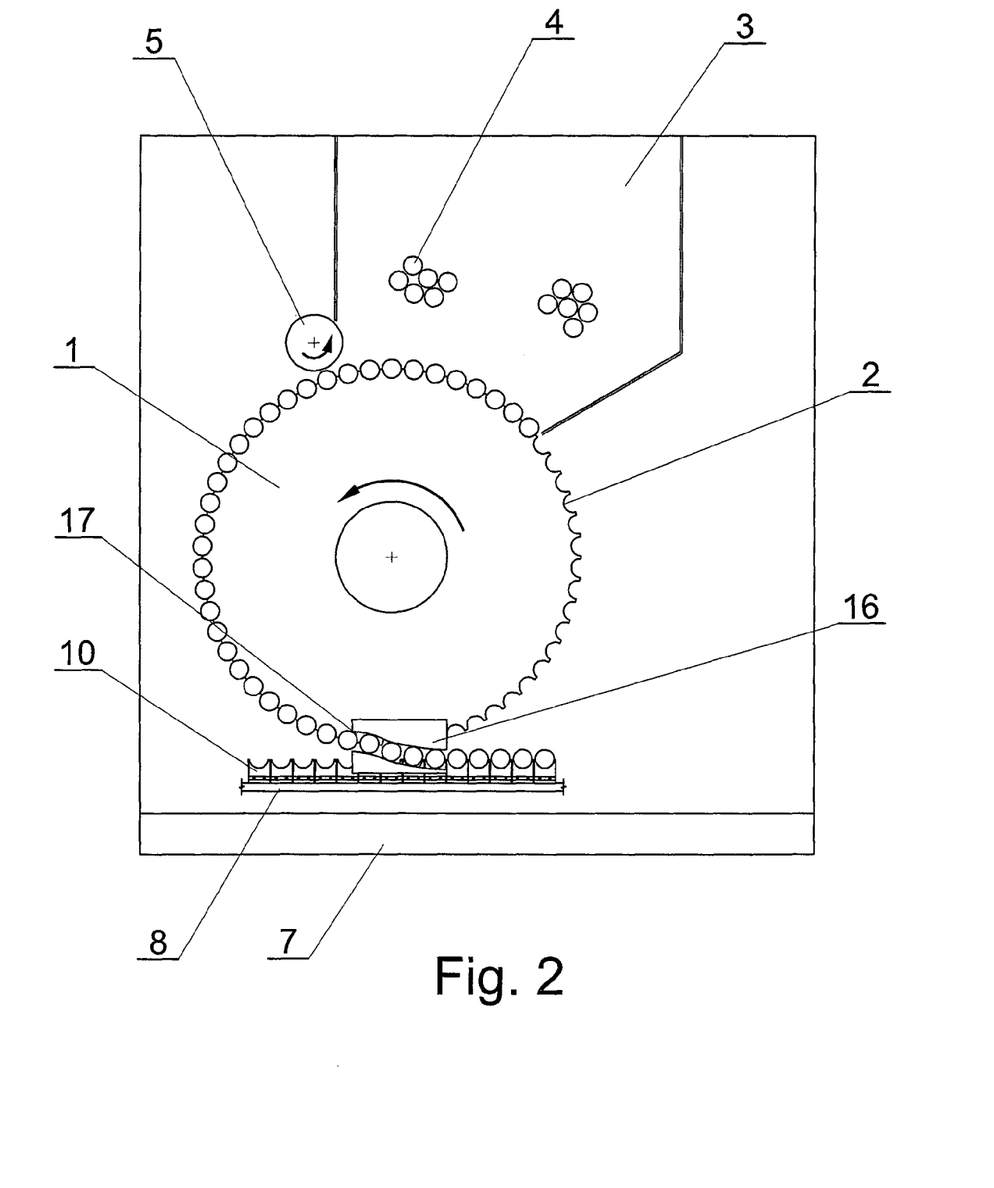
Figure 3:
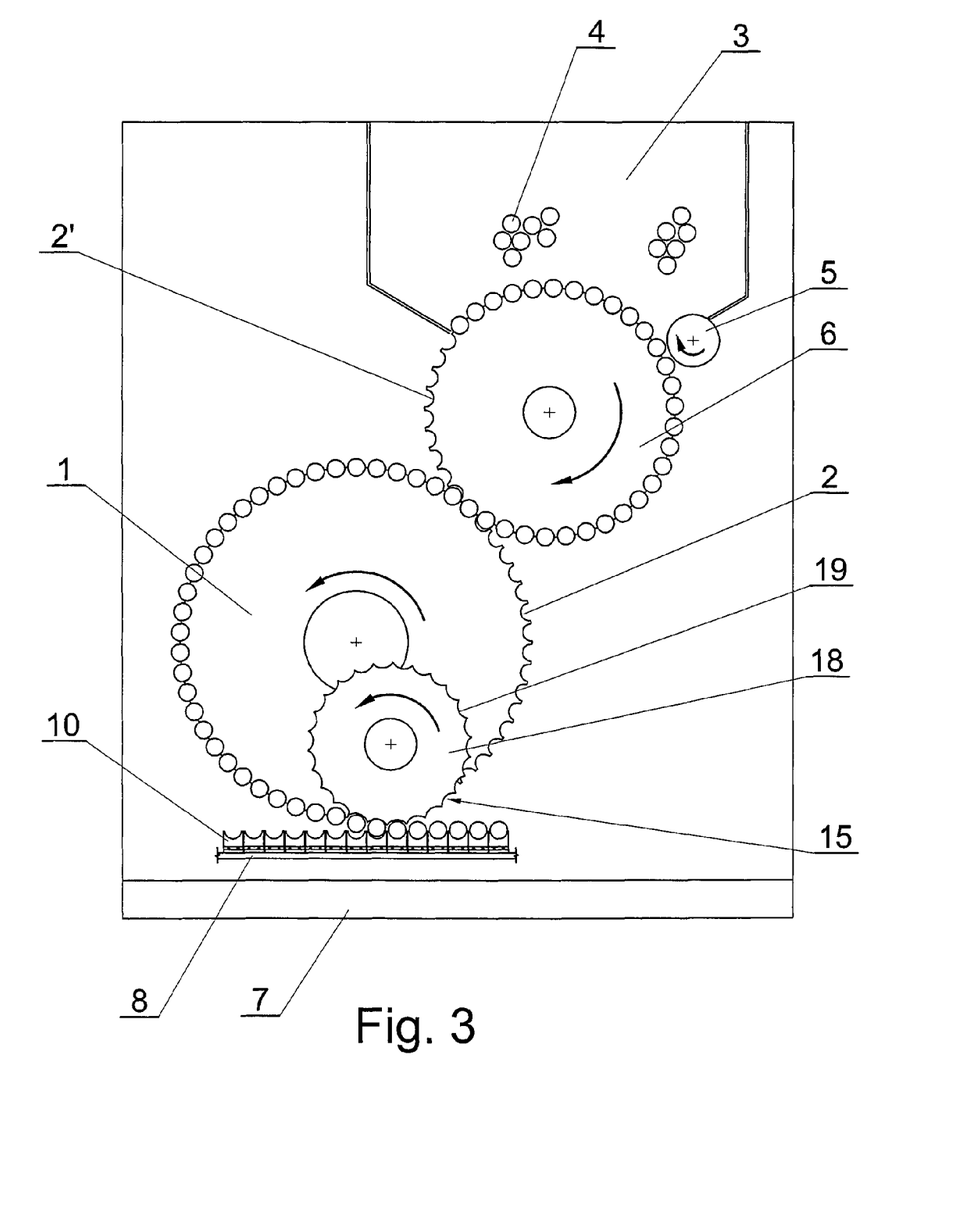
Figure 4:
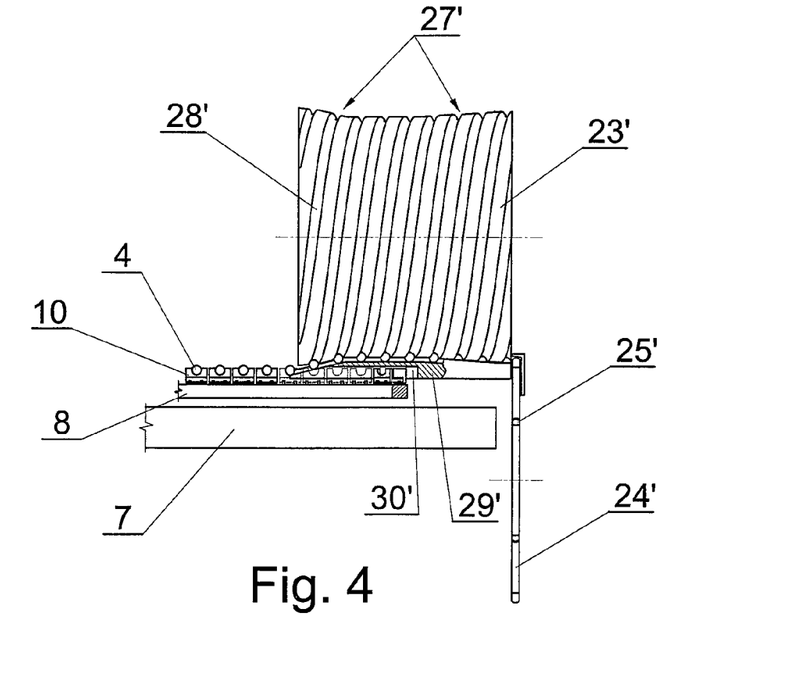
Figure 5:
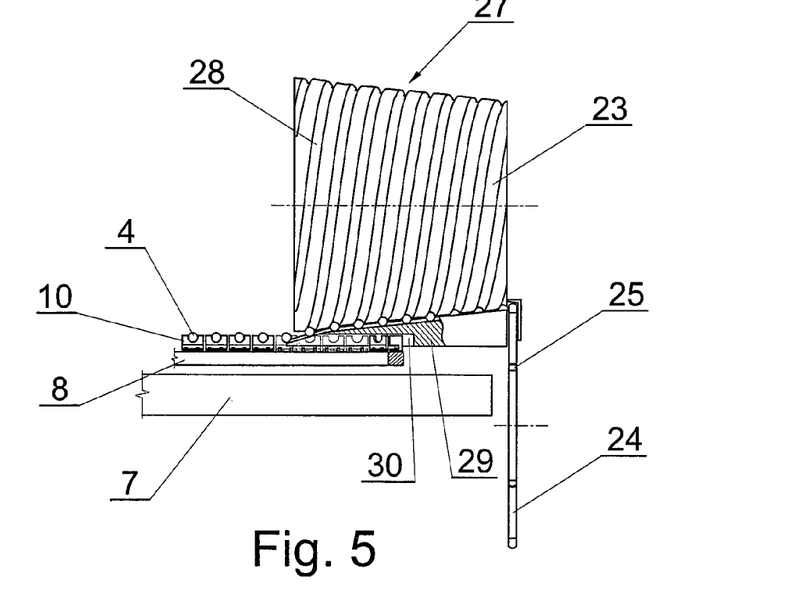
Figure 6:
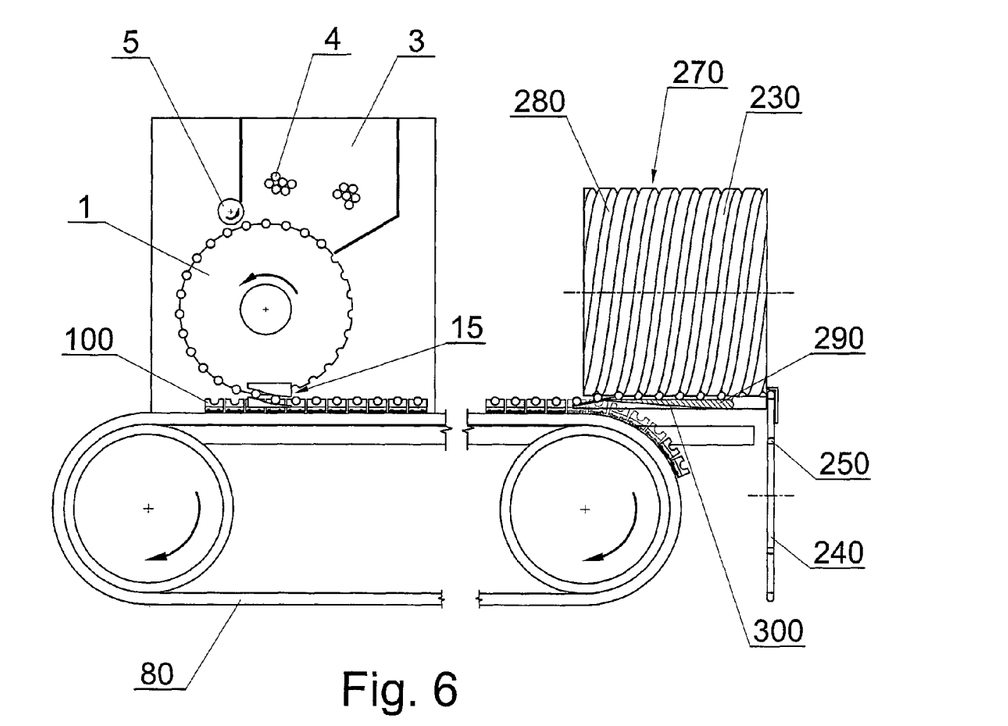
Figure 7:
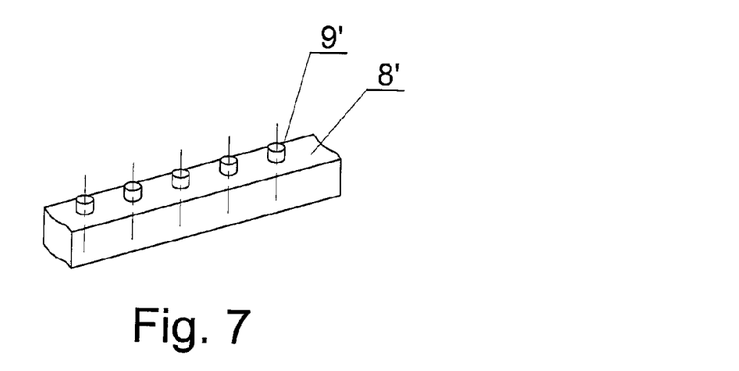
Figure 8:
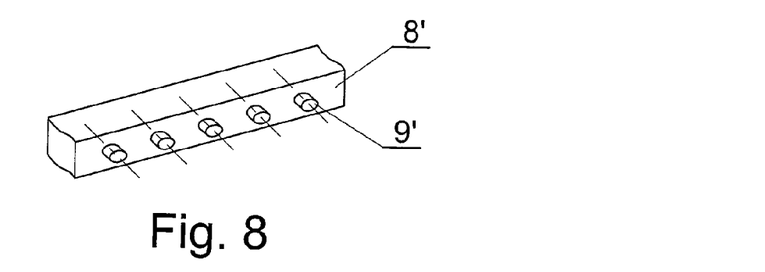
Figure 9:
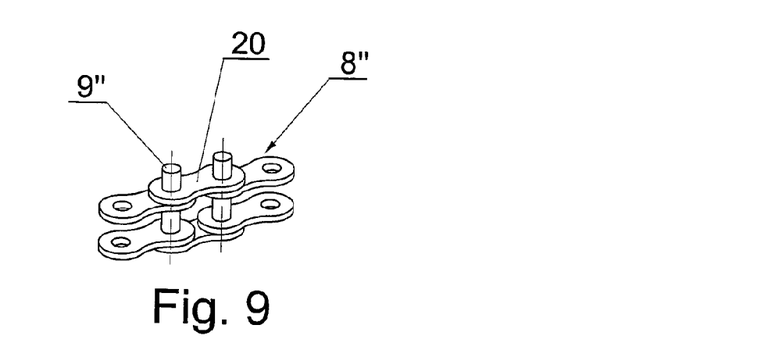
Figure 10:
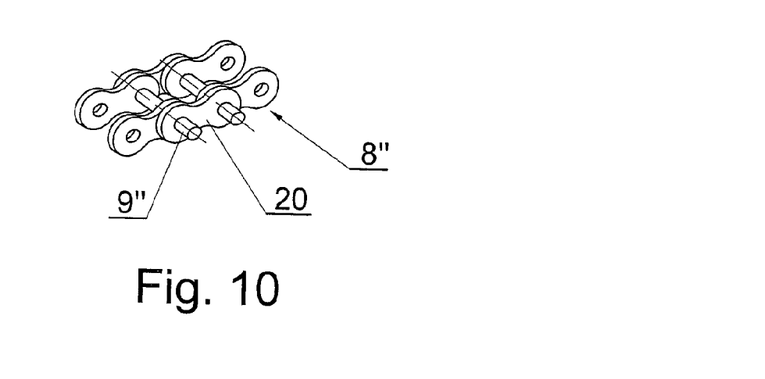
Figure 11:
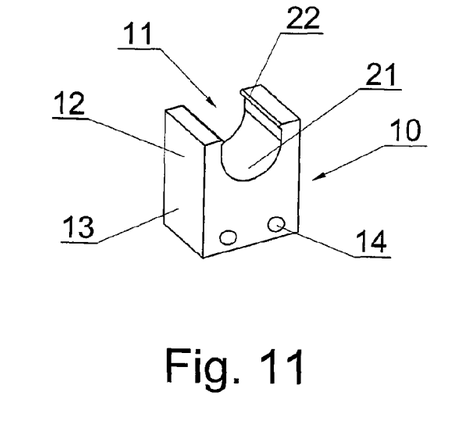
Figure 12:
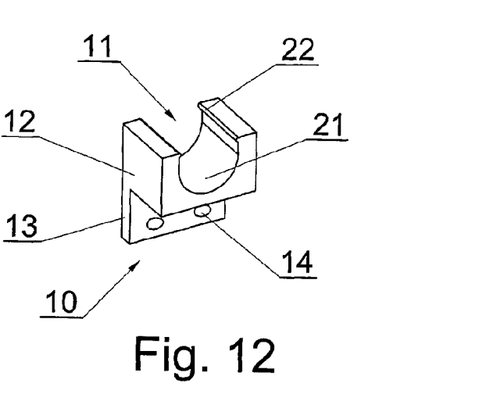
Figure 13:
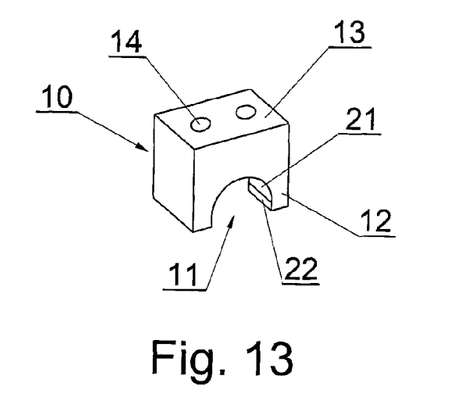
Figure 14:
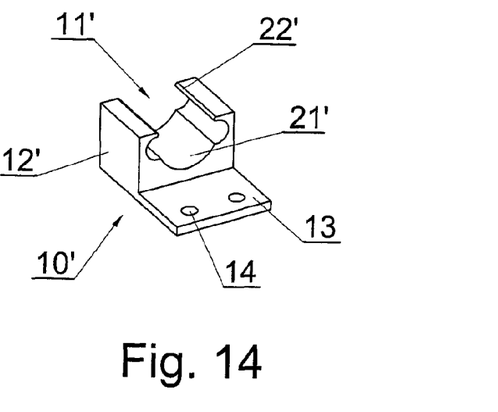
Figure 15:
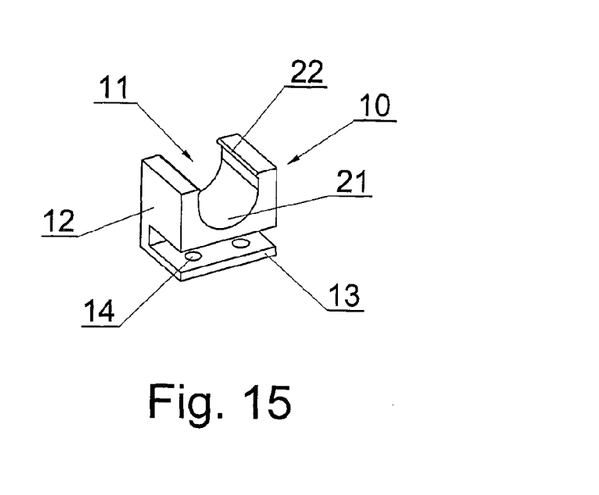

The device shown has a guiding drum 1 with a horizontal axis of rotation, provided with flutes 2 on its periphery parallel to the drum axis 1 through which the segments 4 are collected from a hopper 3, whereas at the junction of the edge of the hopper 3 with the drum 1 a rotating roller 5 protecting against jamming of the segments 4 is disposed. The segments 4 can be delivered from the hopper 3 to the drum 1 by means of an intermediate drum 6 with a horizontal axis of rotation, having flutes 2' on its periphery identical with the flutes 2 on the guiding drum 1. Beneath the guiding drum 1, on a frame 7, is horizontally situated circumferentially closed conveyor 8, provided with spigots 9 on which are mounted seats 10 having a catching element 11, a cylindrical segment 4 shaped in the body 12 of the seat 10. Each seat 10 has a base 13 in which are disposed holes 14 for mounting the seat 10 on the spigots 9 of the conveyor 8, whereas for mounting known joining methods such as gluing, press-in fastening, form-locked fastening or fastening using connecting elements such as clamping or locking rings can be used. Between the guiding drum 1 and the seats 10 of the conveyor is situated a push-down element 15 for delivering the segments 4 from the flutes 2 of the drum 1 to the catching elements 11. The push-down element 15 can be constituted by a cam 16 provided with a groove 17 with the height corresponding to the diameter of the segment 4. The cam 16 enclosing the drum 1 on two sides causes that the segments 4 entering the groove 17 are pushed out of the flutes 2 due to the cooperation of the ends of the segments 4 projecting beyond the edge of the flute 2 with the surfaces of the groove 17 which then in a similar way push the segments 4 into the catching elements 11 in the seats 10. As an alternative, the push-down element 15 can be constituted by rotating wheels 18 with the axis of rotation parallel to the axis of the guiding drum 1, provided with circular sectors 19 on the periphery with a radius slightly greater than a half of the diameter of the segment 4 with the function of such sectors being similar to that of the surface of the groove 17 in the cam 16. The conveyor 8 can have the form of a flexible belt 8' provided with spigots 9' for mounting the seats 10, projecting above its surface, whereas the axes of the spigots 9' can be situated vertically or horizontally. As an alternative, the conveyor 8 can have the form of a chain 8" the links 20 of which are connected by pivots protruding above the surface of the link 20, forming spigots 9" for mounting the seats 10, whereas the axes of the spigots 9" can be situated vertically or horizontally. The catching element 11 can have the form of a depression 21 in the body 12 of the seat 10 shaped as a half of a cylinder, corresponding to the diameter of the segment 4, whereas the axis of the depression 21 is perpendicular to the direction of motion of the conveyor 8. The catching element 1 can be provided with locks 22 on edges, where such locks can be constituted by longitudinal profile elements, and the function of the lock 22 can also be performed by surfaces with a greater friction coefficient. In addition, the diameter of the depression 21 can be selected in such a way that the conveyed segments 4 are pushed into the depression 21. As an alternative, the catching element 11' can have the form of a depression 21' in the body 12' of the seat 10' with the height greater than a half of the diameter of the segment 4, provided with locks 22' on edges, whereas the depression 21' is perpendicular to the direction of motion of the conveyor 8. The body 12 of the seat 10 is constituted by a rectangular solid, whereas the base 13 with holes 14 can be situated with its plane parallel or perpendicular to the axis of the catching element 11. In the former case the seat 10 is mounted on spigots 9', 9" of the conveyor 8 with axes situated vertically, and in the latter case the seat 10 is mounted on spigots 9', 9" of the conveyor 8 with axes situated horizontally. The segments 4 are collected from the seats 10 of the conveyor 8 by a spiral drum 23 which delivers the segments 4 to a rotary transferring element N provided with pushers 25 on its periphery by means of which the segments 4 are appropriately put onto a grouping tape 26 where various segments are combined in filter rods. The spiral drum 23 has a conical surface 27 on which a spiral groove 28 with the width corresponding to the diameter of the segment 4 is formed. Underneath the spiral drum 23, on the frame 7, is situated a ramp 29 with a surface parallel to the conical surface 27, having a groove 30 along which the conveyor 8 with the seats 10 moves so that the ends of the segments 4 protruding out of the catching element 11 meet the surface of the ramp 29 which pushes the segments 4 consecutively into the groove 28 of the spiral of the drum 23, and then supports the segments 4 placed in the groove 28 until the moment of delivery to the element N the axis of rotation of which is substantially parallel to the axis of the spiral drum 23. In case of a spiral drum 23' with two conical surfaces 27' with opposite inclination angles relative to the axis of the drum 23', the ramp 29' situated underneath has two surfaces matching the inclination angles of the conical surfaces 27' of the drum 23'. Such solution can be used if the pushers 25' of the transferring element 24', collecting the segments 4, are situated in one plane with the conveyor 8. In another embodiment of the device (FIG. 6) a conveyor 80 in the form of a flexible belt provided with projecting spigots with axes perpendicular to the direction of its motion, moving in a vertical plane, was used, with a spiral drum 230 having the form of a cylinder on the outer surface 270 of which a spiral groove 280 is shaped. Beneath the drum 230 is situated a guide 290 with a surface parallel to the generator of the drum 230, having a groove 300 along which the conveyor 80 with seats 100 moves so that the protruding ends of segments 4 are pushed consecutively into the groove 280 of the spiral of the drum 230. In the embodiment shown, the guiding drum 1 collecting the segments 4 directly from the hopper 3 and transferring the segments 4 to the seats 100 of the conveyor 80 by means of the push-down element 15 in the form of a cam was used. The said embodiment can be used when the pushers 250 of the transferring element 240, taking the segments 4, are situated in one plane with the conveyor 80.

The invention claimed is:

1. A device for transferring cylindrical filter segments from a filter segment hopper onto a grouping tape delivering the segments in a linear method to a machine manufacturing multi-segment filter rods, comprising:
    a guiding drum with a horizontal axis of rotation, having flutes on its periphery, the guiding drum collecting the segments,
    a circumferentially closed conveyor, and
    a rotary transferring element, provided with pushers on its periphery, which places the segments onto the said grouping tape,
    wherein the circumferentially closed conveyor is provided with seats having a catching element for catching the segments which are transferred from the guiding drum, and,
    wherein the segments are transferred from the circumferentially closed conveyor to the rotary transferring element by a spiral drum.

2. The device as in claim 1, further comprising an intermediate drum with a horizontal axis of rotation, having flutes on its periphery, the intermediate drum transferring the segments to the flutes of the guiding drum.

3. The device as in claim 1, further comprising a push-down element, disposed between the guiding drum and the seats of the conveyor, the push-down element transferring the segments from the flutes of the guiding drum to the catching elements of the seats of the conveyor,
    wherein the push-down element comprises a cam provided with a groove with a height corresponding to the diameter of the segments.

4. The device as in claim 1, further comprising a push-down element including rotating wheels with the axes of rotation parallel to the axis of the guiding drum,
    wherein the rotating wheels are disposed symmetrically on both sides of the guiding drum,
    wherein the rotating wheels are provided with circular sectors on the periphery thereof, the circular sectors having a radius greater than a half of the diameter of the segments, and,
    wherein the rotating wheels transfer the segments from the flutes of the guiding drum to the catching elements of the seats of the conveyor.

5. The device as in claim 1,
    wherein the catching element has the shape of a depression in the body of the seat in the form of a half of a cylinder, corresponding to the diameter of the segment and provided with locks on edges, and
    wherein the axis of the depression is perpendicular to the direction of motion of the conveyor.

6. The device as in claim 1, wherein the conveyor has projecting spigots for mounting the seats.

7. The device as in claim 6, wherein the conveyor comprises a chain, the links of the chain being connected by pivots protruding above the surface of the link, forming spigots for mounting the seats.

8. The device as in claim 7, wherein the pivots of the spigots are situated vertically.

9. The device as in claim 5,
    wherein the body of the seat comprises a rectangular solid with a catching element shaped in the upper wall thereof, and
    wherein holes for mounting the seat are disposed in the base of the body.

10. The device as in claim 9, wherein the plane of the base of the seat is situated parallel to the axis of the catching element.

11. The device as in claim 9, wherein the plane of the base of the seat is situated perpendicular to the axis of the catching element.

12. The device as in claim 1, wherein the spiral drum has at least one conical surface.

13. The device as in claim 12,
    wherein a ramp is disposed underneath the spiral drum, the ramp having a surface parallel to the conical surface of the spiral drum, and
    wherein the ramp comprises a groove along which the conveyor with the seats moves, so that ends of segments protruding out of the catching element meet the surface of the ramp which pushes the segments consecutively into the groove of the spiral of the drum.

14. The device as in claim 13,
    wherein the spiral drum has two conical surfaces with opposite inclination angles relative to the axis of the drum, and
    wherein the ramp has inclination angles matching the inclination angles of the conical surfaces of the drum.

15. The device as in claim 1, wherein the spiral drum has the form of a cylinder.

16. The device as in claim 15,
    wherein a guide with the surface parallel to the generator of the spiral drum is disposed underneath the spiral drum, and
    wherein the guide has a groove along which the conveyor with the seats moves so that ends of segments protruding out of the catching element are pushed consecutively into the groove of the spiral of the drum.

* * * * *